Oct. 22, 1957     O. A. KESER, 2ND     2,810,365
APPARATUS FOR RESISTOR FILM DEPOSITION
Filed Dec. 31, 1952     2 Sheets-Sheet 2
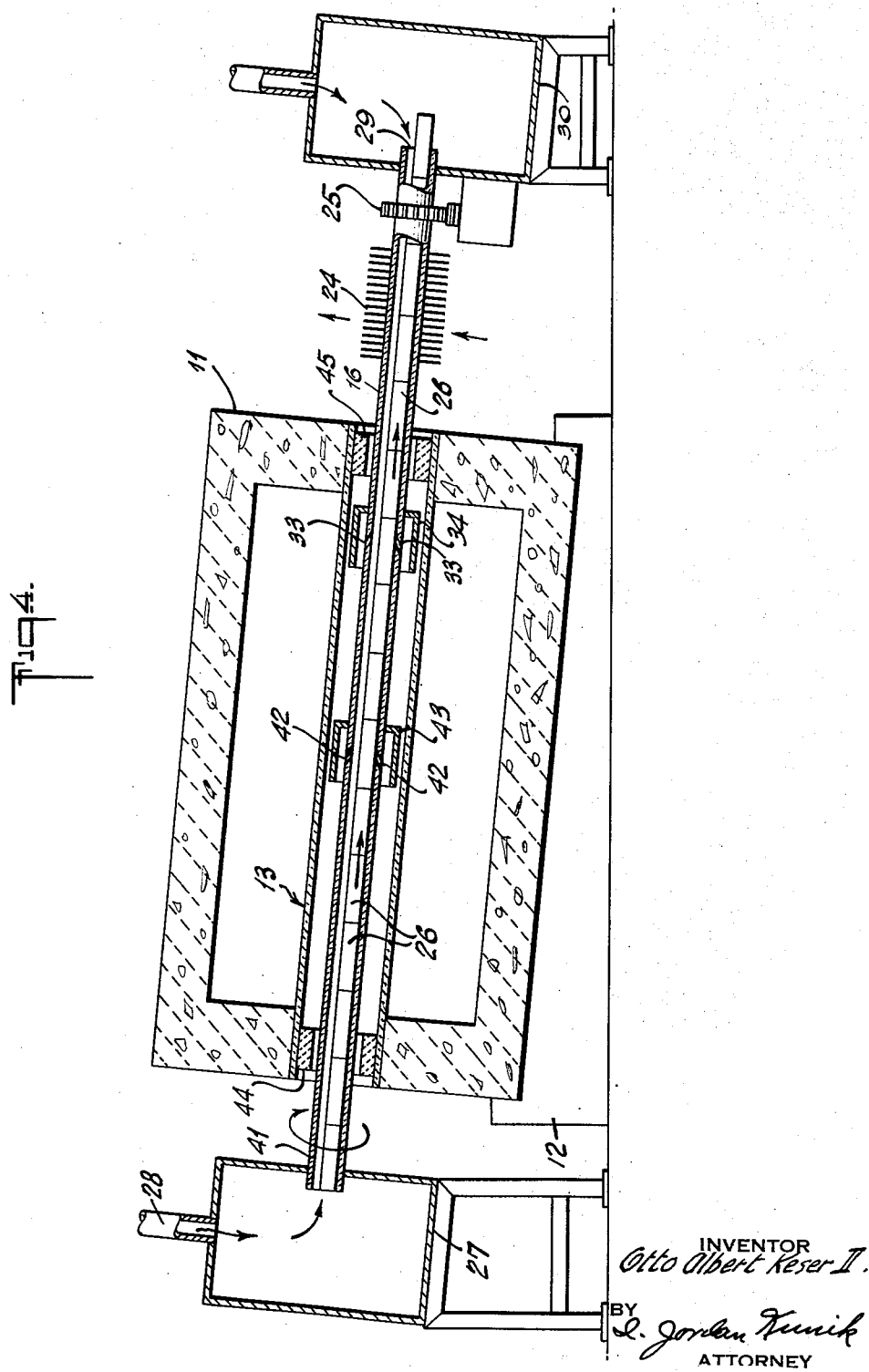
INVENTOR
Otto Albert Keser II.
BY
I. Jordan Kunik
ATTORNEY United States Patent Office 2,810,365
Patented Oct. 22, 1957

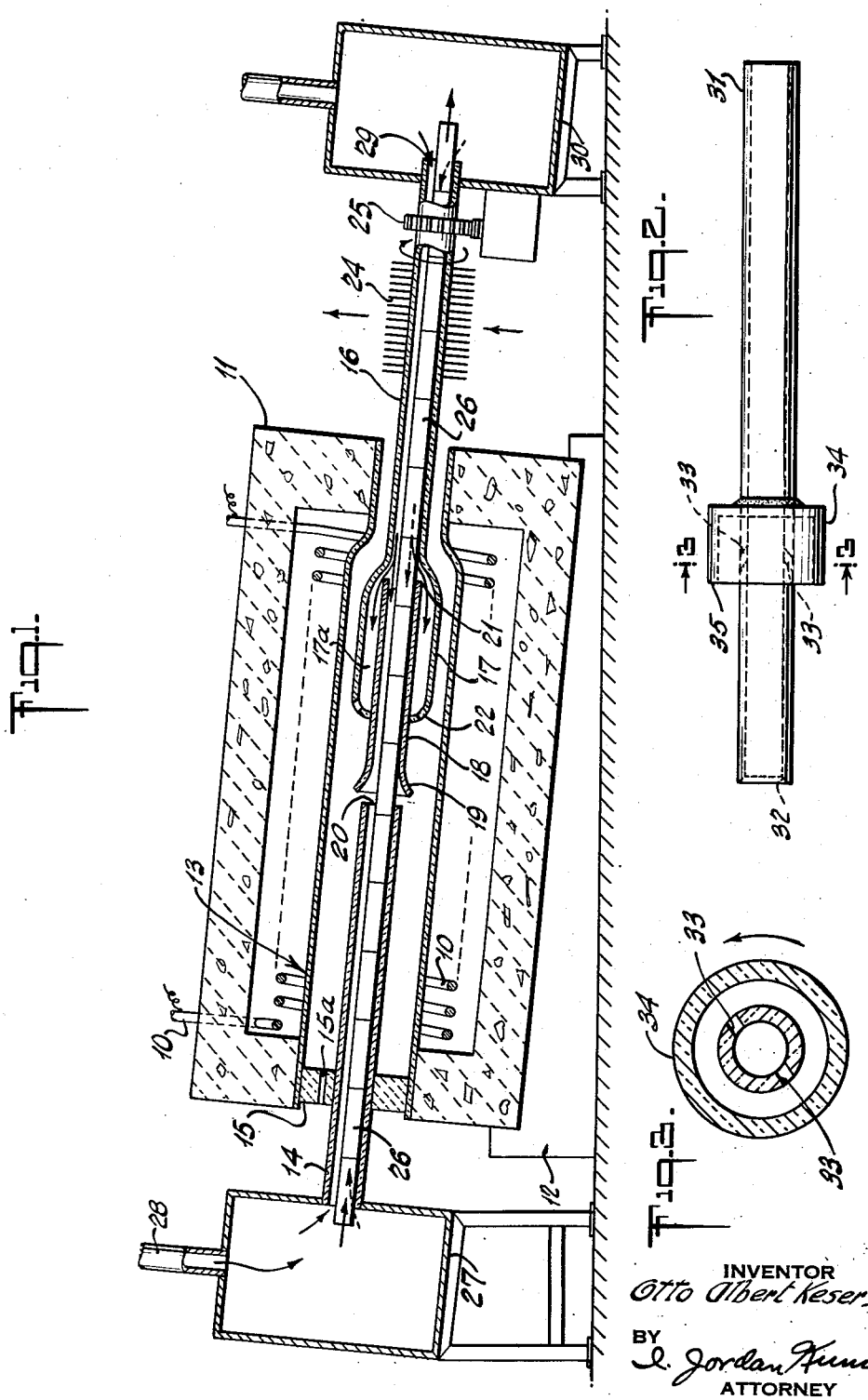

2,810,365

APPARATUS FOR RESISTOR FILM DEPOSITION

Otto A. Keser 2nd, Havertown, Pa., assignor to Shallcross Manufacturing Company, Collingdale, Pa.

Application December 31, 1952, Serial No. 328,945

5 Claims. (Cl. 118—47)

This invention relates to the pyrolytic deposition of carbon, and more particularly to apparatus for and methods of continuously producing uniform resistive films on resistor bodies by the utilization of atmospheres containing carbon or combinations of carbon with additive atmospheres containing, for example, suitable compounds of boron, aluminum, silicon, germanium and tin.

In making deposited carbon or borocarbon resistors, the important aims are to produce hard, uniform films having a microcrystalline structure, and to prevent the deposition of amorphous carbon or sooty matter during this process.

It is, therefore, an object of the invention to provide apparatus for and methods of applying upon the surface of ceramic or other refractory bodies a uniform, hard carbon film without the co-deposition of soot or other deleterious foreign matter.

Another object of the invention is to provide an apparatus for and method of producing soot-free, deposited hard carbon films of precise resistance value desired for resistor manufacture by an economically continuous process.

To accomplish these objects certain essential conditions are provided for by the apparatus and method of the present invention, as follows:

The temperature of the film producing atmospheres must be sufficiently high to produce pyrolysis or cracking thereof. In the presence of the cracked gas, the temperatures of the ceramic bodies should be higher than that of the gas in order to produce hard, microcrystalline film deposits, and to prevent sooting. The respective temperatures of the gases and of the ceramic bodies must be continually stable and uniform to produce similar film deposits on each body. The atmospheres of cracked gases surrounding the ceramic bodies must be free of oxygen during deposition; and after deposition, the film must be protected from contact with oxygen until its temperature is reduced sufficiently to prevent rapid oxidation from taking place. The surface of the ceramic body to be coated must be symmetrically and equally presented to the cracked gases for uniform radial and axial film distribution thereon. The bodies must be presented to the cracked gas atmosphere for a controlled period of time to obtain the desired resistance values. Also, uniform gas composition must be maintained.

In order to produce deposited film resistors in accordance with the principles of the invention, there is provided a furnace including a continuously rotating reaction chamber which may be slightly tilted from the horizontal and through which heated ceramic bodies are passed against a counterflow of heated carbon bearing atmospheres or atmospheres capable of co-depositing carbon with other desired elements such as boron or the like.

In order to ensure the deposition of good films and to prevent sooting, a portion of the atmospheres containing the depositing materials is divided out from the main stream of said atmospheres at a point or at several points in the deposition portion of the apparatus in order to establish the desired deposition conditions therein. The deflected portion or portions of the pyrolytic atmosphere is led out of the furnace at suitable exhaust points.

The split flow system of the present invention also facilitates the deposition of the resistive film on the resistor bodies in the coating chamber with the deposition atmosphere flowing at substantially constant flow conditions. Said conditions are also controlled, among other things, by the dimensional relationships between the ceramic bodies and the internal diameter of the coating chamber.

Where additive elements are desired, such as, for example, aluminum, silicon, boron, germanium and tin, or the like, they are obtained by intermixing suitable gaseous compounds of these elements with the carbon bearing gas in various proportions, and these elements are co-deposited with the carbon in the pyrolytic reaction tube to form the film with the desired resistance characteristics. Although the mechanism of co-deposition is not entirely known, it is clear that the ultimate film deposit from such combined atmospheres is predominantly carbon, with possibly trace amounts or slightly more than trace amounts of the co-deposited element.

The features of novelty which I believe to be characteristic of my invention are set forth with particularity in the appended claims. My invention itself, however, both as to its fundamental principles and as to its particular embodiments, will best be understood by reference to the specification and accompanying drawings, in which:

Figure 1 is a side view, in schematic form and for the most part in cross section, of a depositing apparatus for coating ceramic or other refractory bodies with carbon film and the like;

Fig. 2 is an enlarged side view, partly in phantom outline, showing an alternative form of reaction chamber which may be utilized in the apparatus shown in Fig. 1;

Fig. 3 is a cross section view taken approximately on line 3—3 of Fig. 2; and

Fig. 4 is a side view, similar to Fig. 1, but some parts being omitted, showing a still further modification of an apparatus embodying the principles of the present invention.

Referring now to Fig. 1 of the drawing, there is shown a furnace 11 positioned on platform 12, said furnace being made of a suitable refractory material and enclosing a chamber within which there extends lengthwise a generally cylindrical heating tube 13 made of fused silica or other suitable refractory material. Tube 13 is heated by a single unitary heating means which may comprise, for example, a heating element 10, to provide the desired temperature conditions within the furnace, the terminals of said elements extending out of the furnace and being connected to a suitable source of electric power. Other suitable means for heating tube 13 may be utilized. The outer peripheries of the ends of heating tube 13 are effectively sealed into the respective end walls of furnace 11. It will be noted that the furnace and heating tube are tilted at an angle for reasons that will be explained in greater detail hereinafter.

The heating elements within the furnace maintain the appropriate temperature conditions within tube 13, whereby the ceramic bodies are heated to the required temperature and thermal decomposition of carbon bearing or other film producing atmospheres will occur within the reaction elements contained within said tube.

Positioned coaxially within heating tube 13 is a cylindrical feed tube 14 which extends through an annular support ring 15, and for the greater portion of its length to a point substantially midway between the ends of tube 13. Feed tube 14 serves to introduce the bodies to be coated into the heating tube. That portion of feed tube 14 which extends into tube 13 constitutes the heating chamber wherein the ceramic bodies are raised to the proper temperature before coating. Ring 15 may have one or more ports 15a extending therethrough to permit the escape of effluents from tube 13.

Positioned axially opposite feed tube 14 is a cylindrical rotatable exit tube 16 which extends through the opposite end of tube 13. Tube 16, through which the coated bodies are removed from the furnace, extends through the end of tube 13 and rotates in a bearing support just outside of furnace 11. The external peripheries of tubes 14 and 16 are spaced apart from the internal periphery of tube 13 so that various effluents from the coating reaction may escape from the furnace.

That portion of exit tube 16 that extends into the furnace widens into a generally cylindrical bulbous portion 17. The end of bulbous portion 17 extending furthest into tube 13 narrows down to a circular aperture within which is sealed a coaxial cylindrical reaction tube 18, said reaction tube extending in axial alignment with feed tube 14 and having a flaring mouth 19 positioned opposite and close to the open end of feed tube 14. Said flaring mouth 19 also serves as a guide surface to ensure the proper entry of the ceramic bodies into tube 18. The other exit end 21 of reaction tube 18 extends inwardly within bulbous portion 17 for the greater distance thereof and is positioned just short of the point where bulbous portion 17 narrows down to tube 16. The respective internal diameters of tubes 14, 16 and 18 are substantially the same.

Near the circular line at which tube 18 is sealed to bulbous portion 17, one or more small ports 22 are positioned in said bulbous portion circumferentially around tube 18 and which permit communication between heating tube 13 and the space within bulbous portion 17.

Exit tube 16 also serves as a passageway for introducing coating atmospheres into reaction tube 18. The space between tube 18 and bulbous portion 17 provides a bypass channel for the coating gas introduced through tube 16, some of said gas passing directly into tube 18 while a portion of the gas passes around exit end 21 into the bulbous portion 17 and out through ports 22. The portion of tube 16 external to the furnace may be provided with a plurality of cooling fins 24, over which air may be blown to cool the ceramic bodies as they emerge from the deposition process.

Tube 16 is rotated about its axis by any suitable mechanism operatively connected to gear 25 on said tube, as shown schematically by way of example. The rotation of tube 16 also causes the rotation of tube 18 sealed to bulbous bypass portion 17, thereby rotating bodies 26 as they pass through the reaction tube 18.

In one embodiment, reaction tube 18 rotates at the rate of 300 R. P. M., which rate produces uniform films and at the same time provides sufficient agitation to assist the transit of the ceramic bodies through the tube. Other speeds of rotation may be arrived at by empirical means depending upon the rate of passage of ceramic bodies and uniformity of films deposited.

Tubes 13, 14, 18, 16 and bulbous portion 17 are made of suitable refractory materials such as Vycor glass which is substantially 90% silica, or mullite, or high alumina materials. The inside diameter of reaction tube 18 may range from approximately a minimum of 1.2 times the diameter of bodies 26 to approximately a maximum of 1.7 times the diameter of said bodies in order to provide clearance for gas passage. The maximum internal diameter of tube 18 must be limited by the necessity of preventing the mechanical jamming of bodies 26 as they rotate while passing through said tube or while passing across the gap between tubes 14 and 18.

A plurality of ceramic bodies 26 in the form of cylindrical rods are fed into feed tube 14 by a cam feed, or by a suitable continuous feed process, said feed processes not being shown since they are well known in the art and form no part of the present invention. It is preferable, however, to feed the ceramic rods 26 by means of a continuous feed.

Rods 26 may be fed into tube 14 from feed chamber 27 into which an inert or non-reactive gas is introduced through inlet 28 in order to prevent any carry-over of reactive materials, such as oxygen or the like, into the reaction chamber by the transit of said bodies through tube 14. It is possible, however, to dispense with such neutral or inert gas in some cases, since the greater natural flow of gases from the opposite direction through reaction tube 18 and from bulbous portion 17 will prevent any oxygen bearing atmosphere from entering into the zone where it might disturb the coating conditions.

Although it is possible to carry out the principles of the invention by positioning the furnace elements in a horizontal line, a preferred embodiment, as illustrated in Fig. 1, provides for tubes 14, 18 and 16, which are in axial alignment, to be tilted at a suitable angle whereby ceramic bodies 26 descend through said tubes in part by the force of gravity. Said bodies, butted end to end, are also pushed by the feed mechanism through the tube somewhat in excess of their normal fall by gravity so as to maintain the desired control over the speed of their passage through the furnace.

Thus, the forces required to overcome the frictional resistance of this system are minimized by this tilting of the apparatus from the horizontal so that gravitational forces are sufficient to cause natural travel of ceramic bodies 26 through rotating tubes 16 and 18 at slightly less than the feeding rate. The feeding mechanism then remains in control of the longitudinal motion, while exerting only minor forces to the column of ceramic bodies passing through the apparatus.

The flaring mouth 19 of tube 18 is positioned sufficiently near mouth 20 of tube 14 that, despite the space between said mouths, the ceramic bodies 26 pass from tube 14 to tube 18 while being maintained in their straight line transit through the furnace. This same condition is provided between the exit end 21 of tube 18 and the adjacent mouth of tube 16 for the passage of bodies 26 from one tube to the other.

The exit mouth 29 of tube 16 extends into coating gas supply chamber 30 which may also serve as a receptacle for coated bodies 26. Although tube 16 rotates, a suitable sealing means (not shown) is provided between chamber 30 and tube 16 whereby atmospheric oxygen or other deleterious gases and substances may be excluded.

In operation, the cylindrical ceramic bodies 26 are fed at controlled uniform rates by any suitable means into feeding tube 14 from chamber 27 which may be arranged to be free of any oxygen or other deleterious and contaminating gases. In some embodiments, no gas is fed through said chamber and into tube 14, but it may be desirable in some instances to pass a neutral gas through the feed tube to prevent any possible carry over of oxygen into the reaction tube. Said neutral gas may comprise nitrogen or any other similar inert atmosphere.

The ceramic bodies 26 to be coated become heated to the desired temperature as they enter and pass continuously through tube 14. As the heated bodies 26 continue their transit through tube 14 they attain the proper temperature for deposition of films and are then transferred from the end 20 of tube 14 across a small gap into continuously rotating tube 18. The ceramic bodies 26 are long enough to extend over the gap between mouth 20 of tube 14 and mouth 19 of tube 18 so that they are maintained in a continuous straight line without their being deflected from their transit into tube 18 in which the coating process takes place.

Rotating tubes 18 and 16 similarly guide the longitudinal transit of and impart a radial motion to ceramic bodies 26 by contact with the tube walls until said bodies pass completely through the furnace and through a cooled portion of tube 16 outside the furnace.

The length of tube 18 constitutes generally the reaction zone wherein controlled pyrolysis of the gases and film deposition on the ceramic bodies take place. Tube 18 also serves as a means for maintaining the proper temperature differential between the ceramic bodies and the pyrolyzed gas. Tube 16 also serves as a conduit to guide and control the flow of gases as well as a means for cooling the coated bodies in a protective atmosphere. Bulbous portion 17 surrounding tube 18 serves to provide the proper gas velocity in tube 18.

The carbon bearing gas, which is composed of a suitable hydrocarbon, and which may contain additives such as boron compounds if desired, and possibly a neutral gas such as nitrogen, is fed by suitable means into the cold end of rotating tube 16. This gas flow in tube 16 is then opposite in direction to the transist of ceramic bodies and takes place in the free space between the inside wall of rotating tube 16 and the ceramic bodies 26. Since the gas does not contain oxygen, it provides a protective atmosphere for the film as the coated ceramic bodies cool in the portion of tube 16 outside of the furnace. The bodies are cooled upon contact with the tube wall, which may, in turn, be cooled by suitable outside cooling means 24 and by the cool carbon bearing gas flowing counter to the flow of said coated bodies.

As the carbon bearing gas progresses toward the heated end of rotating tube 16, the velocity is controlled by the area of the free space and the rate of gas introduction. This gas velocity is sufficient to prevent the gases from reaching pyrolyzing temperature before reaching tube 18, although the gas becomes heated through contact with the hot coated ceramic bodies progressing out of the furnace.

At a point where rotating tube 16 is entirely within the furnace and is heated to furnace temperature, tube 16 widens into a bulbous portion 17 which provides an alternate gas passage 17a arranged in a manner so as not to interfere with the passage of the ceramic bodies and which permits a division of the coating gas flow. Part of the coating gas passes out of passage 17a through ports 22 to exhaust into heating tube 13 as waste gas while the remaining part of said gas continues past the exit end 21 of tube 18 into said tube which is at gas pyrolyzing temperature.

The portion of rotating tube 18 from exhaust end 21 to mouth 19 comprises the reaction section of the apparatus and is the area where film deposition takes place. The flow of gas in said reaction section, tube 18, is at a lower velocity and reduced volume than in the rest of tube 16 due to the split of gas flow into alternate passage 17a. The carbon bearing gas, which is largely heated by convection or conduction and which now is in reaction section 18, rapidly reaches pyrolyzing temperature at which it cracks and provides the proper conditions for the deposition of carbon. This pyrolyzing atmosphere continues to flow counter to the flow of ceramic bodies 26 and is exhausted at mouth 19 of reaction tube 18 into heating tube 13. During the passage of the cracked gas in reaction tube 18 it uniformly contacts the surfaces of ceramic bodies 26 by virtue of the longitudinal and radial motion of said bodies and resistive films are deposited thereon with uniform distribution.

Thus, rotating reaction tube 18 comprises a distinct area where deposition takes place under definitely controlled conditions, even though this reaction section is in motion, at high temperature and remote from normal or usual methods of control. Because of this control precise quantities of film can be uniformly deposited to obtain any of a wide range of film resistance values (for example: 5 ohms to 15,000 ohms per square inch) within close tolerance (for example: ±5% of any desired value).

The thickness of the film deposit is determined by the nature of the ceramic base, the quantity of deposition elements present, the time of contact of the gas with the base and the temperatures at which deposition takes place. The temperatures in the reaction section of tube 18 are dynamically stabilized due to the uniform flow of gas and the counter-flow of ceramic bodies. A single type of ceramic body is fed into the system during any one operating period. The time of contact of the ceramic body surface with the cracked gas is fixed by the length of reaction tube 18 and the speed of flow of ceramic bodies through it. Since these factors controlling film deposition are held constant, precise control of film thickness is achieved in this system by simple control of the amount of gas introduced to rotating tube 16.

In order to produce a good microcrystalline carbon deposit, instead of amorphous carbon which is detrimental, the ceramic bodies 26 should be introduced to the carbon bearing atmosphere at above the critical temperature of said atmosphere. If the proper differential in temperature is not maintained, then sooting might occur on the ceramic bodies. The requisite temperature relationship between the gas and ceramic bodies to achieve hard microcrystalline carbon film deposits is maintained through reaction tube 18 since the pre-heated ceramic bodies attain a higher temperature than that of the gases which are flowing at a rate which prevents them from attaining the same temperature as the ceramic bodies during the time the gas and bodies are in contact.

According to the system herein, where there is a single unitary heating means surrounding the whole length of the heating tube 13, the ceramic bodies 26 that have been passing through feed tube 14 becomes heated by radiation to a higher temperature than that which can be achieved by the counterflow of carbon bearing gases which are heated by conduction from contact with tube 18 and with the hotter ceramic bodies 26 which have entered into tube 18. Thus, this simple means obviates the necessity for providing several different external heating devices to establish different heat zones within heating tube 13, since by the process inherent in the present invention, the proper differential of temperature between ceramic bodies 26 and of the carbon bearing gas is achieved.

It will be noted that as the coated ceramic bodies leave reaction tube 18 and pass through exit tube 16, said ceramic bodies are still at a high temperature and they cause the counterflowing carbon bearing atmosphere to be preheated in tube 16 before they reach the furnace proper. This is of considerable advantage since it simplifies the overall structure of the furnace and utilizes residual heat in the ceramic bodies to do useful work.

It is also well known that sooting occurs when hot carbon bearing gases oxidize in contact with the ceramics. This condition can exist at exhaust points where the gases burn upon contact with air in tube 13. However, in my apparatus this condition is obviated for the following reasons: The exhausting gases at the end of the reaction tube have little or not carbon to deposit since the amount of carbon in the coating gas introduced to the reaction section is substantially exhausted by deposition on the ceramic bodies before the gas reaches the mouth 19 of reaction tube 18. The gas exhausting at ports 22 moves out of heating tube 13 through suitable apertures, not shown, in rings 15 and 15a which are remote from the path of the ceramic bodies.

The coating gas may consist of methane only or a mixture of methane, nitrogen and hydrogen. The nitrogen is used as an inert medium, while hydrogen is used to reduce traces of oxygen in the gas mixture. Methane is used as the carbon bearing gas since it is easily decomposed under high heat to give up carbon, although other carbon bearing gases such as propane, butane, and the like, may be used. Still higher molecular weight carbon chain compounds may be used even though they may be in liquid form, provided they are properly atomized for use in this pyrolytic procedure.

Other elements may be added to the coating atmosphere for co-deposition with carbon on the ceramic bodies, since films produced by the pyrolytic cracking of such mixed atmospheres may have different desirable properties. One typical mixed atmosphere may contain a boron bearing compound such as tripropylborane, a boron hydride or boron trichloride. Other additive elements such as, for example aluminum, silicon, germanium and tin, may be contained in the coating atmosphere in the form of suitable compounds that may be cracked in reaction tube 18.

The split flow of the carbon bearing atmosphere into bulbous portion 17 provides for the passing of a portion of the coating atmosphere out through ports 22 into heating tube 13. Although two ports are shown in the drawing, more or less may be provided as required. The remainder of the carbon bearing gas passes through reaction tube 18 to give up carbon for deposition upon ceramic bodies 26.

After passing through reaction tube 18, the pyrolytic atmosphere emerges from mouth 19 into heating tube 13 and passes out of tube 13 through port 15a or through the space between tube 16 and the end of tube 13, or both. These exit passages permit the free escape of the exhaust gases without building up any back pressures which would otherwise upset the requisite equilibrium of the deposition process.

By means of the split flow system, a proper balance is established between the flow of carbon bearing gas in reaction tube 18 and out of ports 22 in bulbous portion 17 whereby sooting of the ceramic bodies is obviated and a smooth, even coating of microcrystalline resistive film is deposited. The soot which might form at exhaust ports 22 if any oxygen finds its way into this area is remote from possible contact with the heated ceramic bodies between mouths 19 and 20 and the furnace effluents are discharged from heating tube 13 in such a manner as to prevent contamination of the uncoated ceramic bodies 26 entering the reaction tube.

Also, if a neutral gas is introduced into feed tube 14, its passage out of mouth 20 of said tube and around mouth 19 of tube 18 also helps prevent the deposition of soot on the ceramic bodies.

The carbon bearing atmospheres are introduced and pass through the reaction tube at a rate which is determined by the dimensions of the ceramic bodies and of the reaction tube and bypass ports 22. Should the flow be too slow, then the reaction will occur in exhaust tube 16 prior to the entrance of the gas to the reaction zone in tube 18; and if the rate of flow is too high, then there is a loss of control over the deposition reaction.

It is understood that the dimensions of the reaction tube 18 may be varied as well as those of bypass bulbous portion 17, and of ports 22, while the carbon bearing gas flow may be adjusted to these dimensions to produce proper carbon deposition.

It will be noted that despite the fact that bodies 26 are in contact with reaction tube 18, an even coating is produced upon the ceramic bodies by virtue of the fact that the reaction tube is in continuous rotation and said ceramic bodies make sufficient revolutions during the coating process to ensure such even coating. The rotation of reaction tube 18 produces a rotational motion upon bodies 26 so that during the coating process all surfaces of said bodies are exposed to the carbon bearing atmospheres. Radial and axial motion of the ceramic bodies 26 relative to the counterflowing carbon bearing atmosphere during the cracking process in the reaction tube is essential to attain even film deposition.

As bodies 26 emerge from the reaction tube 18, they proceed into outlet tube 16 which is also in continuous rotation and they are cooled somewhat by giving off heat to the counterflowing gas. If more rapid cooling is desired, a plurality of cooling fins 24 may optionally be attached to tube 16, and if necessary, a stream of air may be passed through said fins for increased cooling action. The coated bodies then emerge from the mouth 29 of tube 16 into receptacle 30, a suitable gas-tight seal being provided between said tube and said receptacle. The receptacle has an oxygen free atmosphere and the coated bodies may be removed therefrom after they have reached temperatures at which they can be safely handled.

Other suitable means for passing the coated bodies from the apparatus may be devised, such as, for example, mechanical arrangements forming effective gas-tight locks, liquid seals, or gas seals, all of which are known in related arts in one form or another.

An alternative form of combined reaction and exit tube 31 is shown in Figs. 2 and 3, said tube being made of material similar to that of reaction tube 18 and tube 16 in Fig. 1 and serving as an equivalent for both tubes 16 and 18, collectively. Here also a flaring guide surface or mouth 32 is provided for insuring the proper entry of ceramic bodies into the rotating tube 31.

The split flow of the carbon bearing atmosphere is produced by a pair of slots 33, or at least one such slot, to provide communication between the bore of tube 31 and heating tube 13. Slots 33 are cut into the walls of tube 31 and may be longitudinally angled generally in the direction of the flow of film producing gas as shown in the drawing. Slots 33 may also be radially angled as shown in the cross section of Fig. 3, wherein said slots are substantially tangential to the bore of tube 31. Slots 33 are oriented tangentially in a direction opposite to the rotary motion of tube 31 as shown by the arrow in Fig. 3. Thus, the possible turbulence that might be caused by such a split flow is substantially minimized or completely eliminated.

In some embodiments, however, a greater number of slots 33 may be provided and may take other shapes and be disposed in a staggered position lengthwise in tube 31, provided that a proper bypass action is obtained so that part of the counter-flowing gas is diverted into tube 13 before reaching the principal coating area in tube 31 which extends between said slots and mouth 32. The position of slots 33 would be comparable substantially to the position of mouth 21 of reaction tube 18 in Fig. 1.

A shield 34, made of the same material as tube 31 and in the form of a concentric cup, may be cemented around tube 31 and performs substantially the same function as the bulbous portion 17 in Fig. 2 with the free rim 35 of said shield being positioned a substantial distance from mouth 32 of tube 31 so as to obviate the possibility of sooting of the ceramic bodies occurring at said mouth. The internal diameter of tube 31 is controlled by the same considerations as were applicable to tube 18, except that tube 31 serves also as an exit tube analagous to tube 16 in Fig. 1. The overall length of tube 31 is substantially the same as the combined overall linear dimension between the opposite extremities of tubes 16 and 18 in Fig. 1.

A still further embodiment of the present invention is shown in Fig. 4 wherein the ceramic bodies are fed into a single rotating tube 41 joined at the one end to chamber 27, and at the other end to chamber 30 by suitable sealing means, not shown. Tube 41 serves as both a feed tube and a reaction chamber for the moving column of ceramic bodies 26. As before, the coating gas enters tube 41 from chamber 30 in a counterflow to the advancing column of ceramic bodies.

The split flow arrangement for dividing the coating gas comprises slots 33 and shield 34 similar to the embodiment shown in Fig. 2. An extra or final exhaust passage comprising slots 42 and shield 43, which are similar in structure to slots 33 and shield 34, serves the same purpose as the gap between tubes 14 and 18 in Fig. 1 to exhaust the coating atmosphere from the reaction section.

In the structure shown in Fig. 4, ceramic bodies 26 are rotated while they are in the feed portion of tube 41 but that condition does not alter the effectiveness of the coating process that takes place in the reaction section of tube 41 which extends substantially between slots 42 and slots 33 in said tube.

It will also be noted that since tube 41 is connected by suitable bearings (not shown) in chambers 27 and 30 the internal periphery of baffle rings 44 and 45 are spaced somewhat apart from the external periphery of tube 41. Hence the spaces around the tube serve as exhaust ports for the various effluents that emerge from slots 33 and 42 and from heating tube 13. Otherwise, the operating conditions of the embodiment of Fig. 4 are substantially similar to those that obtain in that of Fig. 1.

Although bypass arrangements for splitting the flow of film producing atmospheres have been described hereinabove, in some embodiments it is possible to produce satisfactory hard, crystalline resistive films on ceramic bodies in a single rotating reaction tube having no bypass provisions, provided suitable gas flow conditions are maintained within the tube. However, this is not preferred because of difficulty of control and limited range of film thickness available.

The apparatus and method of the present invention are also intended to produce borocarbon film resistors as well as carbon film resistors. The same apparatus and procedures as outlined hereinabove are utilized, with the exception that the coating atmosphere that is introduced as a counterflow into tube 16 from chamber 30 and thenceforth into the reaction tube 18, comprises a combination of carbon bearing and boron bearing gases. The free carbon and free boron may be derived from the pyrolytic cracking of a single gas, such as tripropyl borane. Otherwise, a mixture compound of boron hydride or boron trichloride, and a hydrocarbon, such as methane or benzene, may be utilized.

Other desirable characteristics may also be incorporated in the resistive film coatings by adding suitable pyrolytic compounds of aluminum, silicon, germanium and tin, for example, to the film producing atmospheres in accordance with the methods outlined above.

In the specification, I have explained the principles of of my invention, and the best mode in which I have contemplated applying those principles, so as to distinguish my invention from other inventions; and I have particularly pointed out and distinctly claimed the part, mode or combination which I claim as my invention or discovery.

While I have shown and described certain preferred embodiments of my invention, it will be understood that modifications and changes may be made without departing from the spirit and scope thereof, as will be clear to those skilled in the art.

I claim:

1. Apparatus for the deposition of resistive film on ceramic bodies comprising a furnace maintained at a temperature to cause thermal decomposition of a film producing atmosphere containing carbon, a tube disposed within said furnace through which said bodies are passed, a reaction zone in said tube where film deposition takes place, means for continually rotating said tube, means for introducing a film producing atmosphere to the exit end of the tube in a direction opposite to the passage of said bodies, at least one aperture in said tube for bypassing a portion of said atmosphere from said tube into said furnace before said atmosphere reaches the reaction zone of said tube, means in said tube on the other end of the reaction zone thereof for exhausting effluents from said reaction zone into said furnace.

2. Apparatus for the deposition of resistive film on bodies, comprising a furnace maintained at a temperature to cause thermal decomposition of a film producing atmosphere, containing carbon, means for transmitting said bodies through said furnace at an angle from the horizontal whereby said bodies advance in part under the force of gravity, an exit at one end of said furnace for removing said bodies from said furnace, a reaction zone in said transmitting means, said reaction zone and exit being in axial alignment with each other, means for introducing a film producing atmosphere through said exit toward said reaction zone opposite to the movement of said bodies, and means for bypassing part of said atmosphere away from said reaction zone and into said furnace at a point prior to its reaching the reaction zone in which the film is deposited upon said bodies.

3. Apparatus for the deposition of resistive film on bodies, comprising a furnace maintained at a temperature to cause thermal decomposition of an atmosphere containing carbon, an entrance on one end of said furnace for feeding bodies into said furnace, an exit at the other end of said furnace for removing said bodies from said furnace, a reaction chamber in said furnace through which said bodies pass between said entrance and said exit, means for introducing the film producing atmosphere through said exit whereby the atmosphere passes through said chamber in a direction opposite to the transit of said bodies, and means said furnace for diverting a portion of said atmosphere approaching from said exit toward said chamber to reduce the volume of said atmosphere that enters said chamber.

4. Apparatus according to claim 3, and further comprising means for rotating said bodies around their longitudinal axes as they pass through said chamber.

5. Apparatus according to claim 4 in which said entrance, said exit and said chamber are in axial alignment and are tilted at an angle from the horizontal whereby said bodies move therethrough at least partially by the force of gravity.

References Cited in the file of this patent

UNITED STATES PATENTS

| | | |
|---|---|---|
| 1,965,059 | Seibt | July 3, 1934 |
| 2,057,431 | Hobrock | Oct. 13, 1936 |
| 2,161,950 | Christensen | June 13, 1939 |
| 2,328,422 | Christensen | Aug. 31, 1943 |